US012783676B2

(12) United States Patent
Shachar et al.

(10) Patent No.: US 12,783,676 B2
(45) Date of Patent: Nov. 3, 2026

(54) BIOS PROTECTION USING AGENT-BASED VALIDATION OF BIOS VERSION

(71) Applicant: Dell Products L.P., Round Rock, TX (US)

(72) Inventors: Tomer Shachar, Beer Sheva (IL); Ophir Buchman, Raanana (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 18/123,002

(22) Filed: Mar. 17, 2023

(65) Prior Publication Data

US 2024/0311485 A1 Sep. 19, 2024

(51) Int. Cl.
*G06F 21/57* (2013.01)
*G06F 9/4401* (2018.01)

(52) U.S. Cl.
CPC .......... *G06F 21/572* (2013.01); *G06F 9/4403* (2013.01); *G06F 2221/034* (2013.01)

(58) Field of Classification Search
CPC . G06F 21/572; G06F 9/4403; G06F 2221/034
See application file for complete search history.

(56) References Cited

U.S. PATENT DOCUMENTS 7,765,409 B2 * 7/2010 Gafken ................. G06F 21/572 726/30
2005/0033954 A1 * 2/2005 Wang .................. G06F 11/1417 713/2
2008/0162675 A1 * 7/2008 Bolay ................. G06F 9/44505 709/221
2011/0191571 A1 * 8/2011 Perusse, Jr. ............... G06F 9/00 713/1
2011/0283142 A1 * 11/2011 Perronne ............. G06F 11/2284 714/E11.02
2012/0303944 A1 * 11/2012 Peng .................. G06F 11/1433 713/2

(Continued)

OTHER PUBLICATIONS

"What is BIOS?"; updated Feb. 18, 2023; https://www.easytechjunkie.com/what-is-bios.htm; downloaded on Mar. 14, 2023.

(Continued)

*Primary Examiner* — Zhe Liu
(74) *Attorney, Agent, or Firm* — Ryan, Mason & Lewis, LLP

(57) ABSTRACT

Techniques are provided for basic input/output system (BIOS) protection using BIOS version validation. One method comprises obtaining, by an entity associated with an operating system of a device, identifiers of designated versions of a BIOS of the device; obtaining, by the entity, an identifier of an active BIOS version; updating, by the entity, the active BIOS version to a given designated version of the BIOS, responsive to the entity determining that the identifier of the active BIOS version does not match the identifiers of the designated versions of the BIOS; and initiating, by the entity, a boot process of the processing device using the given designated version of the BIOS. The identifiers of the designated versions of the BIOS may comprise hash values of corresponding approved versions of the BIOS. The entity may comprise an agent executed by the operating system.

20 Claims, 7 Drawing Sheets

(56) References Cited

U.S. PATENT DOCUMENTS

| | | | | |
|---|---|---|---|---|
| 2015/0081829 | A1* | 3/2015 | Maity | G06F 21/572 709/212 |
| 2015/0149750 | A1* | 5/2015 | Maity | G06F 9/4406 713/1 |
| 2016/0055068 | A1* | 2/2016 | Jeansonne | G06F 21/572 714/15 |
| 2016/0154664 | A1* | 6/2016 | Iwamatsu | G06F 9/45558 718/1 |
| 2018/0276387 | A1* | 9/2018 | Liu | G06F 21/575 |
| 2019/0243637 | A1* | 8/2019 | Nachimuthu | G06F 8/656 |
| 2020/0097658 | A1* | 3/2020 | Samuel | G06F 11/0793 |
| 2020/0218544 | A1* | 7/2020 | Ganesan | G06F 13/4221 |
| 2020/0233676 | A1* | 7/2020 | Jindo | G06F 21/602 |
| 2020/0364340 | A1* | 11/2020 | Khoruzhenko | H04W 12/12 |
| 2021/0117272 | A1* | 4/2021 | Kleppinger | G06F 11/1461 |
| 2022/0156378 | A1* | 5/2022 | Eguchi | G06F 21/51 |
| 2022/0383333 | A1* | 12/2022 | Young | G06Q 10/087 |
| 2024/0012706 | A1* | 1/2024 | Han | G06F 11/1417 |

OTHER PUBLICATIONS

"Calculate Hash of the BIOS"; dated Feb. 24, 2018; https://stackoverflow.com/questions/22095172/calculate-hash-of-the-bios; downloaded on Mar. 14, 2023.

Regenscheid, A. et al.; "BIOS Integrity Measurement Guidelines (Draft)"; downloaded on Mar. 14, 2023.

* cited by examiner

BIOS PROTECTION USING AGENT-BASED VALIDATION OF BIOS VERSION

FIELD

The field relates generally to information processing systems, and more particularly to the protection of devices in such information processing systems.

BACKGROUND

Computing devices are typically configured to incorporate security functionality to protect such devices from malicious activity. For example, it is generally desirable to prevent suspicious computer operations, and to ensure that operations are implemented by legitimate and authorized users. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking.

A need exists for improved techniques for protecting devices from suspicious and/or unauthorized computer operations.

SUMMARY

In one embodiment, a method comprises obtaining, by at least one entity associated with an operating system of at least one processing device, one or more identifiers of one or more respective designated versions of a basic input/output system (BIOS) of the at least one processing device; obtaining, by the at least one entity, an identifier of an active BIOS version; updating, by the at least one entity, the active BIOS version to a given one of the one or more designated versions of the BIOS, responsive to the at least one entity determining that an identifier of the active BIOS version does not match at least one of the one or more identifiers of the one or more respective designated versions of the BIOS; and initiating a boot process of the at least one processing device using the given designated version of the BIOS.

In some embodiments, the one or more identifiers of the one or more respective designated versions of the BIOS comprise hash values of corresponding approved versions of the BIOS. The at least one entity may confirm the active BIOS version, responsive to the at least one entity determining that the identifier of the active BIOS version matches at least one of the one or more identifiers of the one or more respective designated versions of the BIOS.

In one or more embodiments, the updating further comprises updating at least one BIOS chip using an image of the given designated version of the BIOS. The image of the given designated version of the BIOS may be stored in a BIOS staging environment of the at least one BIOS chip by the operating system of the at least one processing device.

In at least one embodiment, prior to the obtaining the one or more identifiers of one or more respective designated versions, the BIOS loads the operating system in conjunction with a boot process of the at least one processing device, and wherein the operating system loads the at least one entity. The initiating the boot process may comprise requesting a user to reboot the at least one processing device. The at least one entity associated with the operating system of the at least one processing device may comprise an agent executed by the operating system.

Other illustrative embodiments include, without limitation, apparatus, systems, methods and computer program products comprising processor-readable storage media.

DETAILED DESCRIPTION

Figure 1:
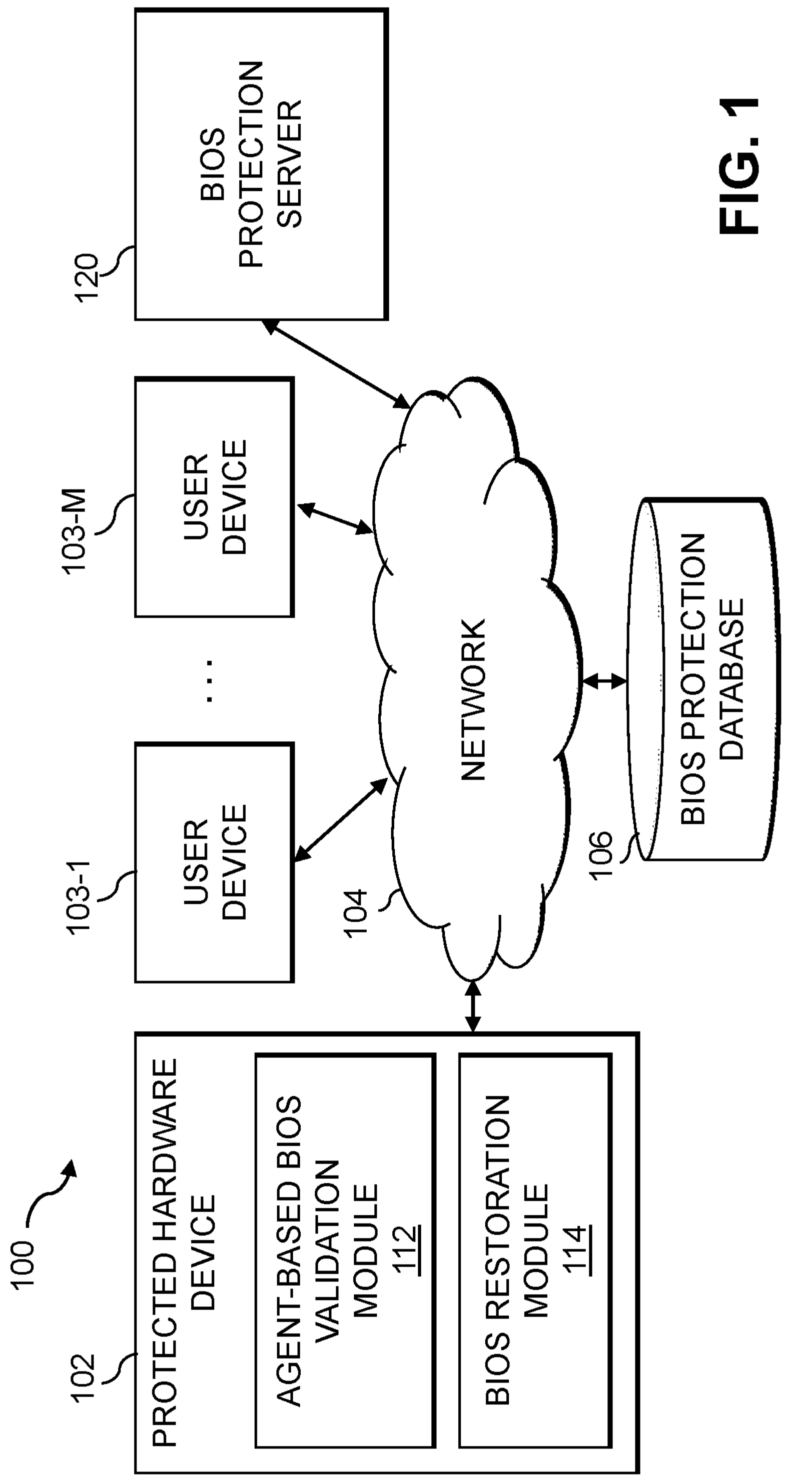
FIG. 1 illustrates an information processing system configured for BIOS protection using agent-based validation of a BIOS version in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for BIOS protection using agent-based validation of a BIOS version.

The BIOS of a given device initializes hardware components of the given device during a boot process and allows the hardware components to properly communicate and work together during device startup. One or more aspects of the disclosure recognize that malicious or unauthorized modifications of a BIOS chip or metadata associated with the BIOS chip may cause a denial of service or permit an unauthorized operating system to be loaded (sometimes referred to as a backdoor attack that may cause unpredictable damage). A BIOS chip is thus important for the proper operation of a given device, and if the BIOS chip is corrupted or damaged, the given device will typically be unable to start up. In addition, a recovery of the BIOS when the BIOS chip is corrupted or damaged is typically complex, costly, and may require a hardware replacement.

In one or more embodiments, techniques are provided for BIOS protection using agent-based validation of the BIOS version. In some embodiments, when an operating system is loading as part of a boot process, the operating system loads a software agent (sometimes referred to herein as an entity or a software entity). The software agent obtains hash values (or other identifiers) of approved (e.g., designated) BIOS versions. The software agent calculates a hash value of the current BIOS version and compares the calculated hash value to the obtained hash values of the approved BIOS versions. If the calculated hash value matches at least one of the obtained hash values of the approved BIOS versions, then the software agent may confirm the current BIOS version. If the calculated hash value does not match at least one of the obtained hash values of the approved BIOS versions, then the software agent updates the current BIOS version to one of the approved BIOS versions, and then initiates a reboot of the device. The BIOS chip may then continue to utilize the confirmed current BIOS or the updated current BIOS to initialize the startup process of a protected hardware device.

In some embodiments, the disclosed BIOS version validation techniques can be employed to protect a given device following an agent-based detection of an unauthorized BIOS version. The BIOS version validation techniques may be employed to restore an unauthorized BIOS version to an approved version and prevent the unauthorized BIOS version from performing unauthorized operations. In this manner, the software agent can update the BIOS and initiate the boot process that allows the operating system of the given device to load.

Among other benefits, the disclosed BIOS version validation techniques protect devices from unauthorized, erroneous and/or malicious actions that may impair the operation of a BIOS chip of a given device. Such actions can be detected and overcome using the disclosed BIOS version validation techniques.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more BIOS protection servers 120 and one or more BIOS protection databases 106, discussed below.

The protected hardware devices 102 may comprise edge devices, host devices and other devices that execute user commands. One or more aspects of the disclosure recognize that edge devices, for example, are attractive targets for an attack and often comprise critical infrastructure that may require an evaluation of whether to execute certain commands and/or operations and/or whether the BIOS has been altered. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise an agent-based BIOS validation module 112 and a BIOS restoration module 114. The agent-based BIOS validation module 112 may perform the disclosed BIOS version validation techniques. The BIOS restoration module 114 may be employed to update the current BIOS version to an approved BIOS version in response to agent-based BIOS validation module 112 detecting that a calculated hash value for the current BIOS version does not match at least one hash value of an approved BIOS version.

It is to be appreciated that this particular arrangement of modules 112, 114 illustrated in the protected hardware device 102 of the FIG. 1 embodiment is presented by way of example only, and alternative arrangements can be used in other embodiments. For example, the functionality associated with modules 112, 114 in other embodiments can be combined into a single element, or separated across a larger number of elements. As another example, multiple distinct processors can be used to implement different ones of modules 112, 114, or portions thereof.

At least portions of modules 112, 114 may be implemented at least in part in the form of software that is stored in memory and executed by a processor. An exemplary process utilizing modules 112, 114 of the protected hardware device 102 in computer network 100 will be described in more detail with reference to FIGS. 3 through 5, for example.

Other protected hardware devices 102 (not shown in FIG. 1) are assumed to be configured in a manner similar to that shown for protected hardware device 102 in the figure.

The BIOS protection server 120 may be implemented, for example, on the cloud, such as a private cloud, or on the premises of an enterprise or another entity. In some embodiments, the BIOS protection server 120, or portions thereof, may be implemented as part of a host device. The BIOS protection server 120 may implement server-side functionality associated with the disclosed BIOS version validation techniques, such as, for example, providing approved BIOS version information, implementing performance monitoring and policies for protection requirements for BIOS chips.

Additionally, the protected hardware device 102 and/or the BIOS protection server 120 can have an associated BIOS protection database 106 configured to store, for example, approved BIOS version information, a set of policies for BIOS protection and/or information related to various devices, such as one or more protected hardware devices 102, such as device locations, network address assignments and performance data. The BIOS protection database 106 may be maintained, for example, by the BIOS protection server 120 and accessible by one or more protected hardware devices 102.

The BIOS protection database 106 in the present embodiment is implemented using one or more storage systems associated with the BIOS protection server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or BIOS protection servers 120 may be implemented on a common processing platform, or on separate processing platforms. The one or more protected hardware devices 102 and user devices 103 may be configured to interact over the network 104 in at least some embodiments with the BIOS protection server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or BIOS protection servers 120 can be one or more input-output devices (not shown), which illustratively comprise keyboards, displays or other types of input-output devices in any combination. Such input-output devices can be used, for example, to support one or more user interfaces to the BIOS protection server 120, as well as to support communication between the BIOS protection server 120 and other related systems and devices not explicitly shown.

The one or more protected hardware devices 102, user devices 103 and/or BIOS protection servers 120 in the FIG. 1 embodiment are assumed to be implemented using at least one processing device. Each such processing device generally comprises at least one processor and an associated memory and implements one or more functional modules for controlling certain features of the respective device.

More particularly, the one or more protected hardware devices 102, user devices 103 and/or BIOS protection servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or BIOS protection servers 120 to communicate in some embodiments over the network 104 with each other (as well as one or more other networked devices), and illustratively comprises one or more conventional transceivers.

It is to be understood that the particular set of elements shown in FIG. 1 for BIOS protection using agent-based validation of a BIOS version is presented by way of illustrative example only, and in other embodiments additional or alternative elements may be used. Thus, another embodiment includes additional or alternative systems, devices and other network entities, as well as different arrangements of modules and other components.

Figure 2:
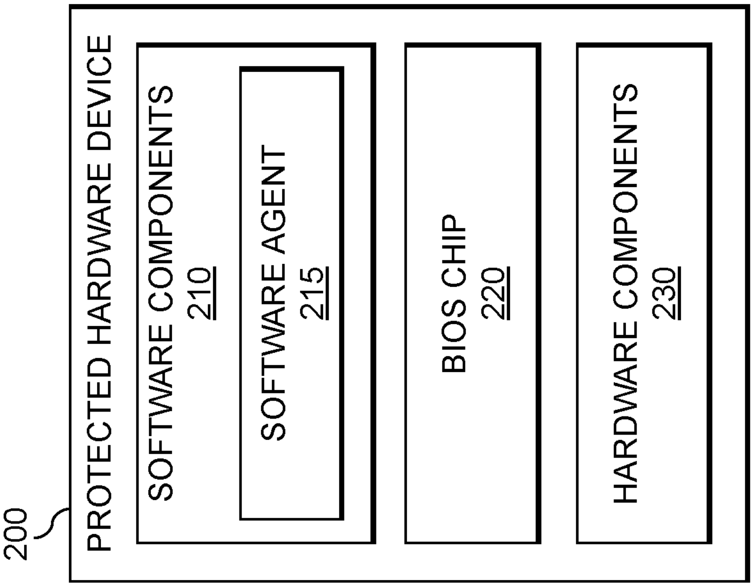
FIG. 2 illustrates the protected hardware device of FIG. 1 in further detail in accordance with an illustrative embodiment.

FIG. 2 illustrates a protected hardware device 200 in accordance with an illustrative embodiment. In the example of FIG. 2, the protected hardware device 200 comprises one or more software components 210 including a software agent 215, a BIOS chip 220, and one or more hardware components 230. The BIOS chip 220 may be implemented, for example, as a BIOS (Basic Input Output System) chip, an Extensible Firmware Interface (EFI) BIOS chip, and/or a Unified Extensible Firmware Interface (UEFI) BIOS chip. The BIOS chip 220 typically initializes hardware during a boot process for a given device. A malicious modification of the BIOS or metadata associated with the BIOS can cause a denial of service or permit an unauthorized operating system to be loaded (sometimes referred to as a backdoor attack that may cause unpredictable damage).

In one or more embodiments, the software agent 215 is installed, for example, on top of an operating system of the protected hardware device 200 at an administrator level. The software agent 215 performs at least some of the BIOS version validation techniques described herein. In some embodiments, the software agent 215 (i) obtains hash values (or other identifiers) of approved (e.g., designated) BIOS versions; (ii) calculates a hash value of the current BIOS version; (iii) compares the calculated hash value to the obtained hash values of the approved BIOS versions; (iv) confirms the current BIOS version, responsive to the calculated hash value matching at least one of the obtained hash values of the approved BIOS versions; and (v) updates the current BIOS version to one of the approved BIOS versions and initiates a reboot of the device, responsive to the calculated hash value not matching at least one of the obtained hash values of the approved BIOS versions. In this manner, the BIOS chip 220 may then continue to utilize the confirmed current BIOS or the updated current BIOS to initialize the startup process of the protected hardware device 200.

A kernel (e.g., resident in the memory of the protected hardware device 200) may provide an interface between the software components 210 and the hardware components 230. The term kernel, as used herein, encompasses any computer program that is part of an operating system of a protected hardware device 200 that enables interactions between such software components 210, such as applications, and the hardware components 230 of the protected hardware device 200. The hardware components 230 may comprise, for example, processing components, memory components, storage components and other hardware components.

Figure 3:
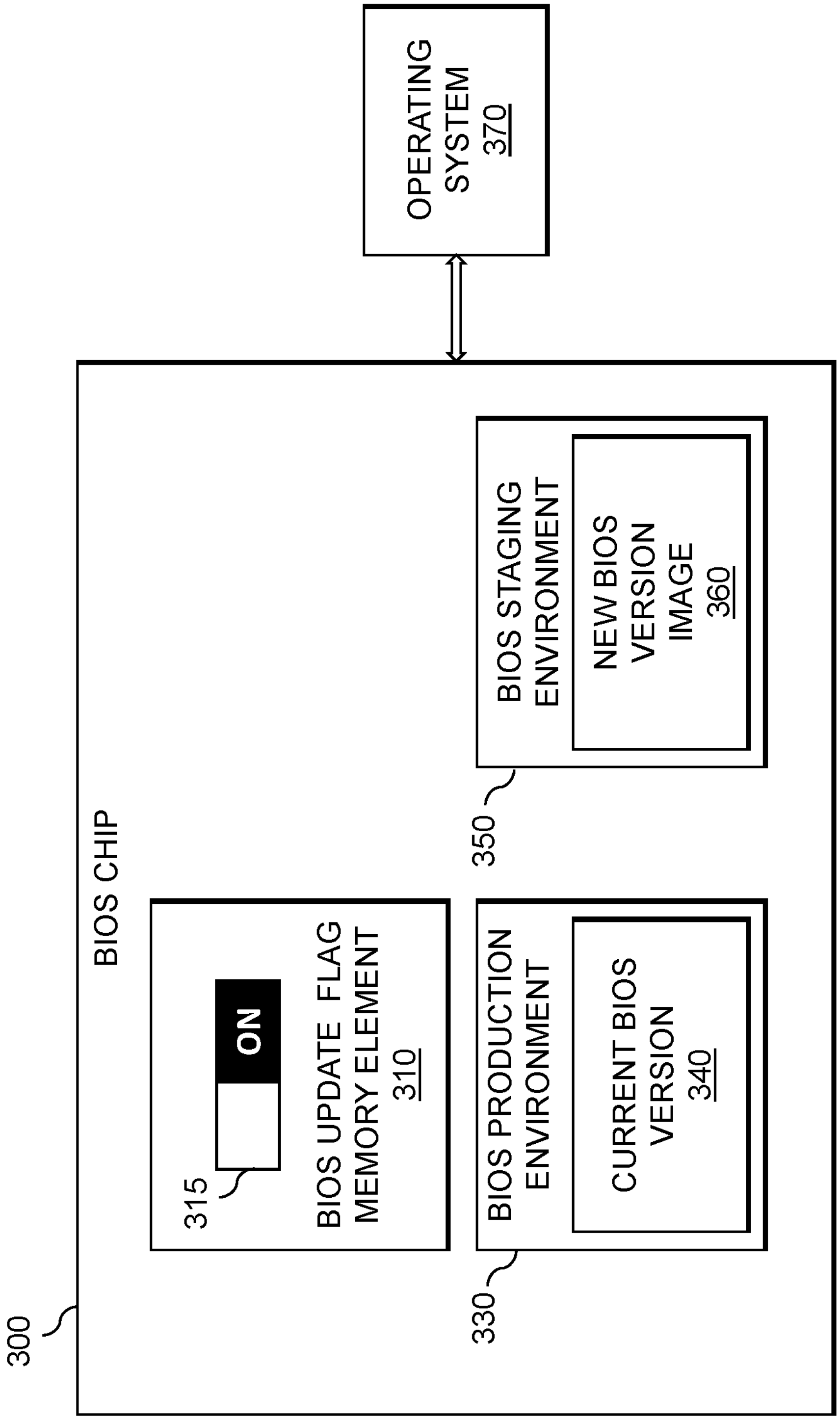
FIG. 3 illustrates a BIOS chip configured to employ BIOS version validation in accordance with an illustrative embodiment.

FIG. 3 illustrates a BIOS chip 300 of a protected hardware device configured to employ BIOS version validation in accordance with an illustrative embodiment. In the example of FIG. 3, the BIOS chip 300 comprises a BIOS update flag memory element 310 (e.g., storing a BIOS update flag value 315), a BIOS production environment 330, comprising a current BIOS version 340, and a BIOS staging environment 350, comprising a new BIOS version image 360. The BIOS chip 300 may be implemented, for example, as an EFI BIOS chip, and/or a UEFI BIOS chip, as modified herein to provide the disclosed BIOS version validation techniques. The BIOS chip 300 interacts with an operating system 370 of the protected hardware device.

In some embodiments, when the software agent determines that a calculated hash value for a current BIOS version does not match at least one hash value for an approved BIOS version, the software agent can update the BIOS by placing an image of a given one of the approved BIOS versions in the BIOS staging environment 350 and setting the BIOS update flag value 315. In this manner, the current BIOS version 340 will be updated to the given approved BIOS version.

Figure 4:
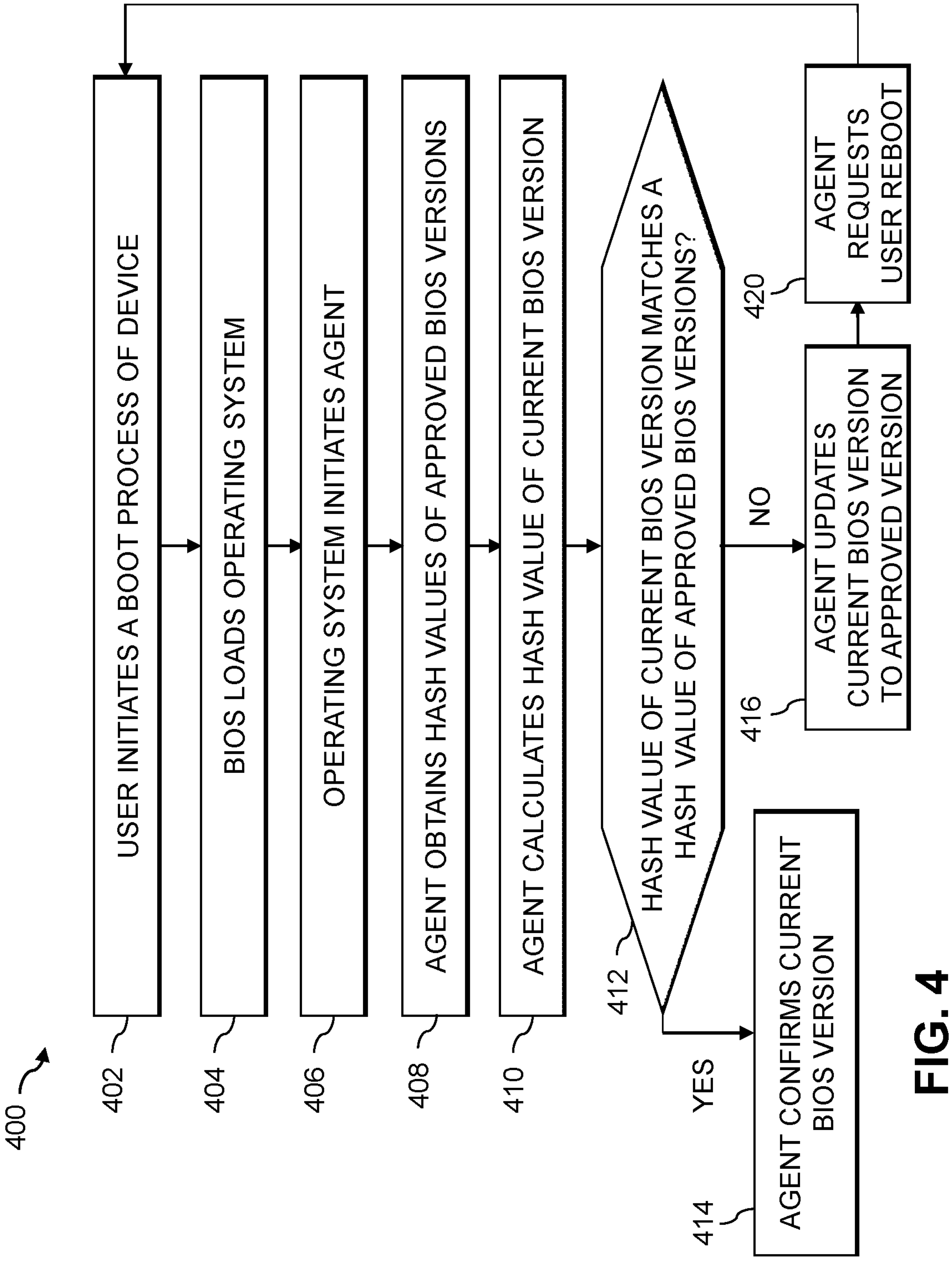
FIGS. 4 and 5 are flow charts illustrating exemplary implementations of processes for BIOS protection using agent-based validation of a BIOS version in accordance with illustrative embodiments.

FIG. 4 is a flow chart illustrating an exemplary implementation of a process 400 for BIOS protection using agent-based validation of a BIOS version in accordance with an illustrative embodiment. In at least some embodiments, portions of the process 400 are implemented, for example, by the software agent 215 of FIG. 2.

In the example of FIG. 4, a user initiates a boot process of a device in step 402. The device BIOS loads the operating system of the device in step 404. In step 406, the operating system initiates an agent (e.g., a software agent).

The agent obtains hash values (or other identifiers) of approved BIOS versions in step 408, and calculates the hash value of the current BIOS version in step 410.

In step 412, the agent determines if the hash value of the current BIOS version matches one of the obtained hash values of approved BIOS versions. If it is determined in step 412 that the hash value of the current BIOS version matches one of the obtained hash values of approved BIOS versions, then the agent confirms the current BIOS version in step 414.

If, however, it is determined in step 412 that the hash value of the current BIOS version does not match one of the obtained hash values of approved BIOS versions, then the agent updates the current BIOS version to the approved BIOS version in step 416 (for example, by placing an image of a given one of the approved BIOS versions in the BIOS staging environment of FIG. 3 and setting the BIOS update flag value 315). In this manner, the current BIOS version will be updated to the given approved BIOS version.

In step 420 the agent requests the user to reboot the device and then program control returns to step 402 and continues in the manner described above.

Figure 5:
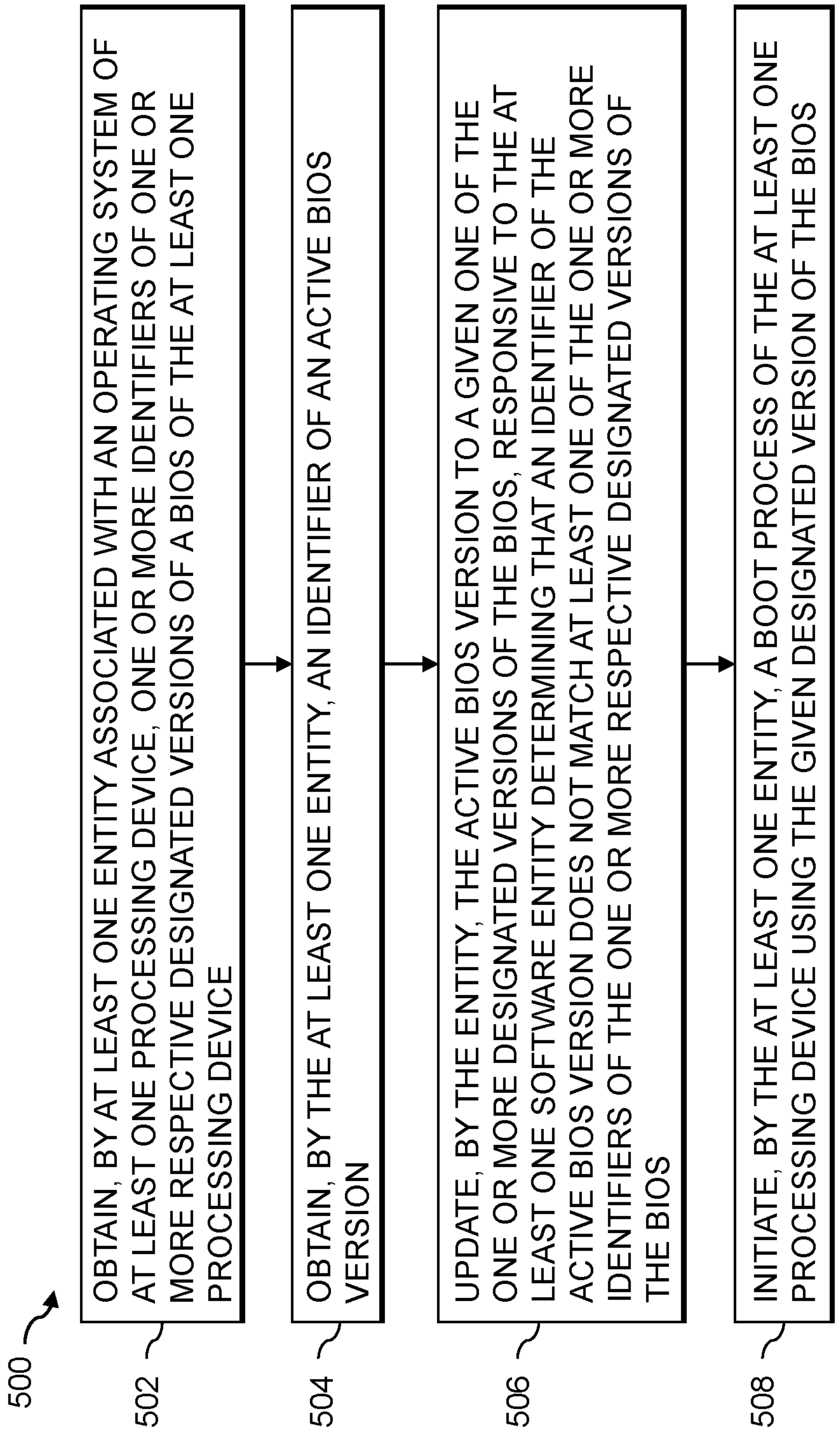

FIG. 5 is a flow chart illustrating an exemplary implementation of a process 500 for BIOS protection using agent-based validation of a BIOS version in accordance with an illustrative embodiment. In the example of FIG. 5, the process 500 obtains, in step 502, by at least one entity associated with an operating system of at least one processing device, one or more identifiers of one or more respective designated versions of a BIOS of the at least one processing device. In step 504, the process obtains, by the at least one entity, an identifier of an active BIOS version. The at least one entity updates the active BIOS version in step 506 to a given one of the one or more designated versions of the BIOS, responsive to the at least one entity determining that an identifier of the active BIOS version does not match at least one of the one or more identifiers of the one or more respective designated versions of the BIOS. In step 508, a boot process of the at least one processing device is initiated using the given designated version of the BIOS.

In some embodiments, the one or more identifiers of the one or more respective designated versions of the BIOS comprise hash values of corresponding approved versions of the BIOS. The at least one entity may confirm the active BIOS version, responsive to the at least one entity determining that the identifier of the active BIOS version matches at least one of the one or more identifiers of the one or more respective designated versions of the BIOS.

In one or more embodiments, the updating further comprises updating at least one BIOS chip using an image of the given designated version of the BIOS. The image of the given designated version of the BIOS may be stored in a BIOS staging environment of the at least one BIOS chip by the operating system of the at least one processing device.

In at least one embodiment, prior to the obtaining the one or more identifiers of one or more respective designated versions, the BIOS loads the operating system in conjunction with a boot process of the at least one processing device, and wherein the operating system loads the at least one entity. The initiating the boot process may comprise requesting a user to reboot the at least one processing device. The at least one entity associated with the operating system of the at least one processing device may comprise an agent executed by the operating system.

The particular processing operations and other network functionality described in conjunction with FIGS. 4 and 5, for example, are presented by way of illustrative example only, and should not be construed as limiting the scope of the disclosure in any way. Alternative embodiments can use other types of processing operations for BIOS protection using agent-based validation of a BIOS version. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for BIOS protection using agent-based validation of a BIOS version can be employed, for example, to protect a given device following an agent-based detection of an unauthorized BIOS version. The BIOS version validation techniques may be employed to restore an unauthorized BIOS version to an approved version and to prevent the unauthorized BIOS version from performing unauthorized operations. In this manner, the software agent can update the BIOS and initiate the boot process that allows the operating system of the given device to load. The disclosed BIOS version validation techniques thus protect devices from unauthorized, erroneous and/or malicious actions that may impair the operation of a BIOS chip of a given device. Such actions can be detected and overcome using the disclosed BIOS version validation techniques.

One or more embodiments of the disclosure provide improved methods, apparatus and computer program products for BIOS protection using agent-based validation of a BIOS version. The foregoing applications and associated embodiments should be considered as illustrative only, and numerous other embodiments can be configured using the techniques disclosed herein, in a wide variety of different applications.

It should also be understood that the disclosed BIOS version validation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for BIOS protection using agent-based validation of a BIOS version may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based BIOS version validation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based BIOS version validation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
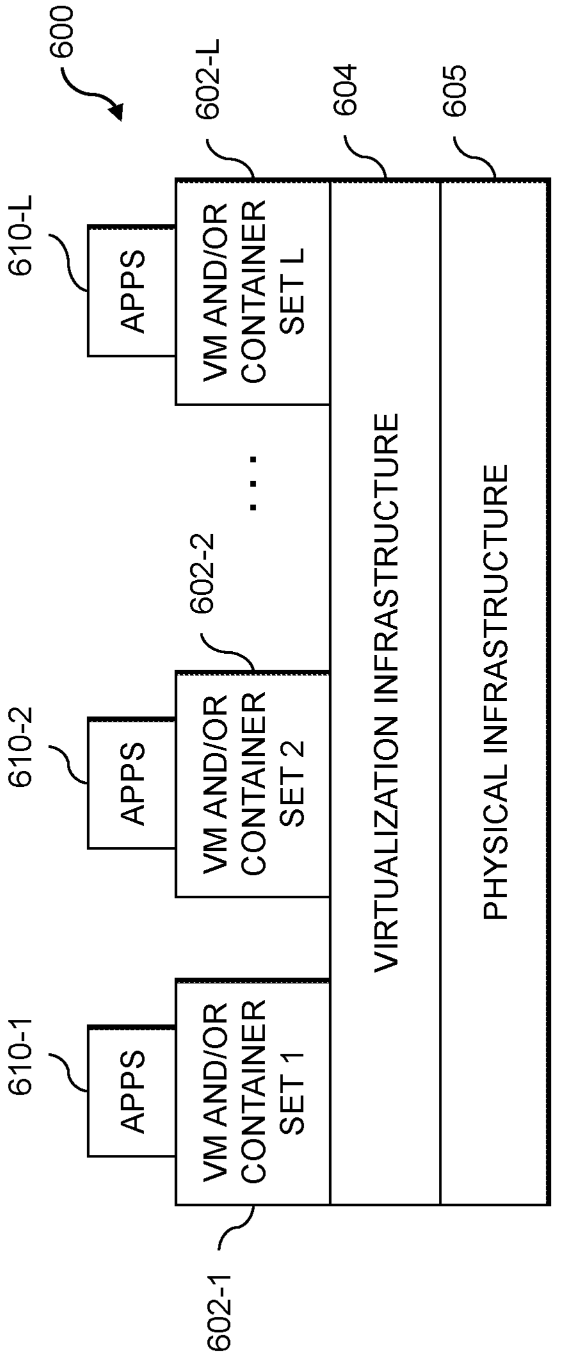
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide BIOS version validation functionality of the type described above for one or more processes running on a given one of the VMs. For example, each of the VMs can implement BIOS version validation control logic and associated BIOS protection functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide BIOS version validation functionality of the type described above for one or more processes running on different ones of the containers. For example, a container host device supporting multiple containers of one or more container sets can implement one or more instances of BIOS version validation control logic and associated BIOS protection functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
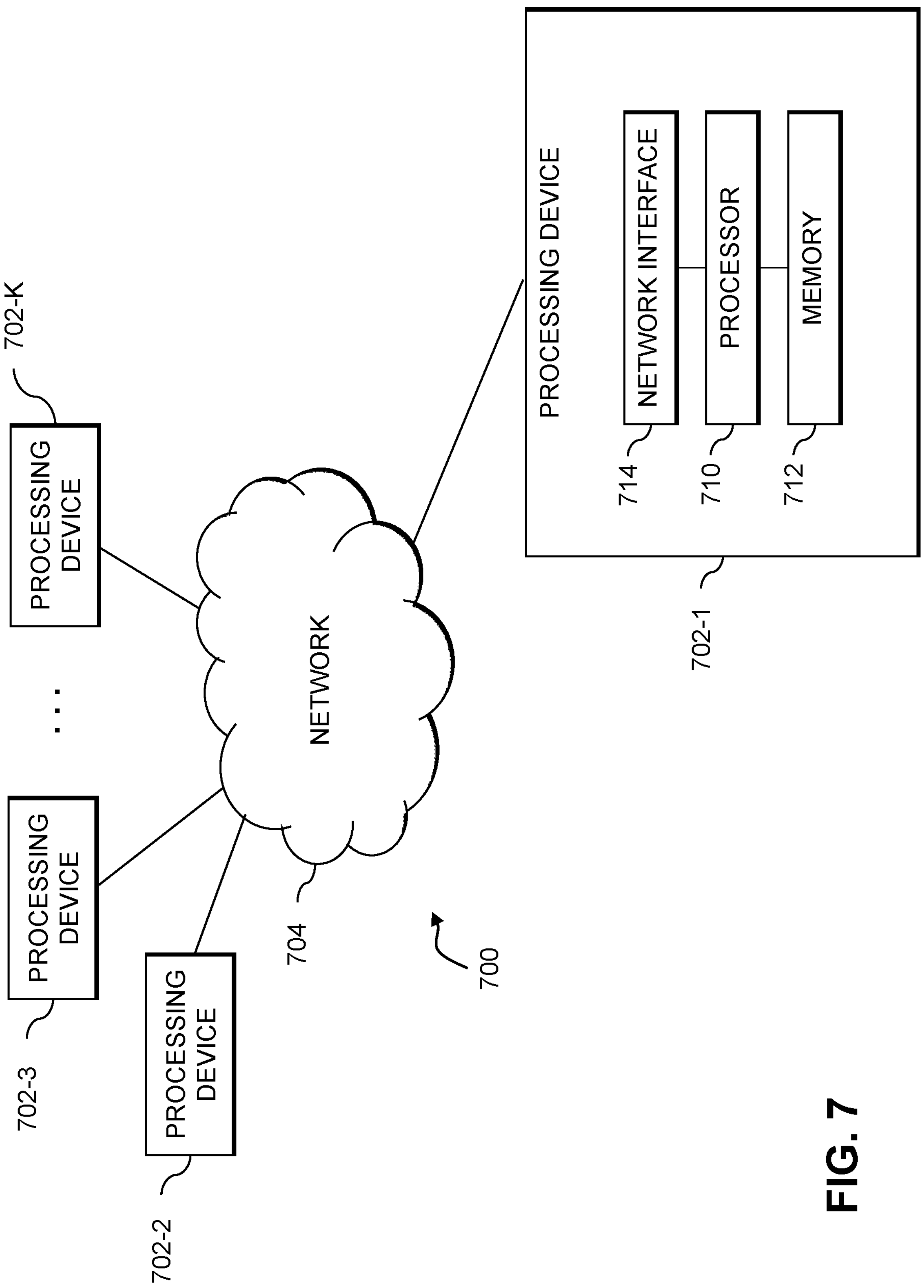
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by at least one software agent associated with an operating system of at least one processing device, one or more identifiers of one or more respective designated versions of a basic input/output system (BIOS) of the at least one processing device, wherein the BIOS loads the operating system in conjunction with a first boot process of the at least one processing device, and wherein the operating system initiates an execution of the at least one software agent;

obtaining, by the at least one software agent, an identifier of an active BIOS version;

in response to the at least one software agent determining that an identifier of the active BIOS version does not match at least one of the one or more identifiers of the one or more respective designated versions of the BIOS:

(i) storing, by the at least one software agent, an image of a given one of one or more approved BIOS versions in a BIOS staging environment at least partially within at least one BIOS chip of the at least one processing device; and (ii) initiating, by the at least one software agent, a second boot process of the at least one processing device using a given one of the one or more respective designated versions of the BIOS, wherein the active BIOS version is updated to the given one of the one or more respective designated versions of the BIOS, using the BIOS staging environment, in conjunction with the second boot process;

wherein the method is performed by the at least one processing device, wherein the at least one processing device comprises a processor coupled to a memory.

2. The method of claim 1, wherein the one or more identifiers of the one or more respective designated versions of the BIOS comprise hash values of corresponding versions of the BIOS.

3. The method of claim 1, wherein the at least one software agent confirms the active BIOS version, responsive to the at least one software agent determining that the identifier of the active BIOS version matches at least one of the one or more identifiers of the one or more respective designated versions of the BIOS.

4. The method of claim 1, wherein the active BIOS version is updated to the given one of the one or more respective designated versions of the BIOS using the image of the given designated version of the BIOS.

5. The method of claim 1, wherein, prior to the obtaining the one or more identifiers of the one or more respective designated versions of the BIOS, the operating system loads the at least one software agent.

6. The method of claim 1, wherein the initiating the second boot process comprises requesting a user to reboot the at least one processing device.

7. The method of claim 1, wherein the at least one software agent associated with the operating system of the at least one processing device comprises an agent executed by the operating system.

8. An apparatus comprising:

at least one processing device comprising a processor coupled to a memory;

the at least one processing device being configured to implement the following steps:

obtaining, by at least one software agent associated with an operating system of at least one processing device, one or more identifiers of one or more respective designated versions of a basic input/output system (BIOS) of the at least one processing device, wherein the BIOS loads the operating system in conjunction with a first boot process of the at least one processing device, and wherein the operating system initiates an execution of the at least one software agent;

obtaining, by the at least one software agent, an identifier of an active BIOS version;

in response to the at least one software agent determining that an identifier of the active BIOS version does not match at least one of the one or more identifiers of the one or more respective designated versions of the BIOS:

(i) storing, by the at least one software agent, an image of a given one of one or more approved BIOS versions in a BIOS staging environment at least partially within at least one BIOS chip of the at least one processing device; and (ii) initiating, by the at least one software agent, a second boot process of the at least one processing device using a given one of the one or more respective designated versions of the BIOS, wherein the active BIOS version is updated to the given one of the one or more respective designated versions of the BIOS, using the BIOS staging environment, in conjunction with the second boot process.

9. The apparatus of claim 8, wherein the one or more identifiers of the one or more respective designated versions of the BIOS comprise hash values of corresponding approved versions of the BIOS.

10. The apparatus of claim 8, wherein the at least one software agent confirms the active BIOS version, responsive to the at least one software agent determining that the identifier of the active BIOS version matches at least one of the one or more identifiers of the respective designated versions of the BIOS.

11. The apparatus of claim 8, wherein the active BIOS version is updated to the given one of the one or more respective designated versions of the BIOS using the image of the given designated version of the BIOS.

12. The apparatus of claim 8, wherein, prior to the obtaining the one or more identifiers of the one or more respective designated versions of the BIOS, the operating system loads the at least one software agent.

13. The apparatus of claim 8, wherein the at least one software agent associated with the operating system of the at least one processing device comprises an agent executed by the operating system.

14. A non-transitory processor-readable storage medium having stored therein program code of one or more software programs, wherein the program code when executed by at least one processing device causes the at least one processing device to perform the following steps:

obtaining, by at least one software agent associated with an operating system of at least one processing device, one or more identifiers of one or more respective designated versions of a basic input/output system (BIOS) of the at least one processing device, wherein the BIOS loads the operating system in conjunction with a first boot process of the at least one processing device, and wherein the operating system initiates an execution of the at least one software agent;

obtaining, by the at least one software agent, an identifier of an active BIOS version;

in response to the at least one software agent determining that an identifier of the active BIOS version does not match at least one of the one or more identifiers of the one or more respective designated versions of the BIOS:

(i) storing, by the at least one software agent, an image of a given one of one or more approved BIOS versions in a BIOS staging environment at least partially within at least one BIOS chip of the at least one processing device; and (ii) initiating, by the at least one software agent, a second boot process of the at least one processing device using a given one of the one or more respective designated versions of the BIOS, wherein the active BIOS version is updated to the given one of the one or more respective designated versions of the BIOS, using the BIOS staging environment, in conjunction with the second boot process.

15. The non-transitory processor-readable storage medium of claim 14, wherein the one or more identifiers of the one or more respective designated versions of the BIOS comprise hash values of corresponding approved versions of the BIOS.

16. The non-transitory processor-readable storage medium of claim 14, wherein the at least one software agent confirms the active BIOS version, responsive to the at least one software agent determining that the identifier of the active BIOS version matches at least one of the one or more identifiers of the one or more respective designated versions of the BIOS.

17. The non-transitory processor-readable storage medium of claim 14, wherein the active BIOS version is updated to the given one of the one or more respective designated versions of the BIOS using the image of the given designated version of the BIOS.

18. The non-transitory processor-readable storage medium of claim 14, wherein, prior to the obtaining the one or more identifiers of the one or more respective designated versions of the BIOS, the operating system loads the at least one software agent.

19. The non-transitory processor-readable storage medium of claim 14, wherein the at least one software agent associated with the operating system of the at least one processing device comprises an agent executed by the operating system.

20. The non-transitory processor-readable storage medium of claim 14, wherein the initiating the second boot process comprises requesting a user to reboot the at least one processing device.

* * * * *